United States Patent Office 2,875,138
Patented Feb. 24, 1959

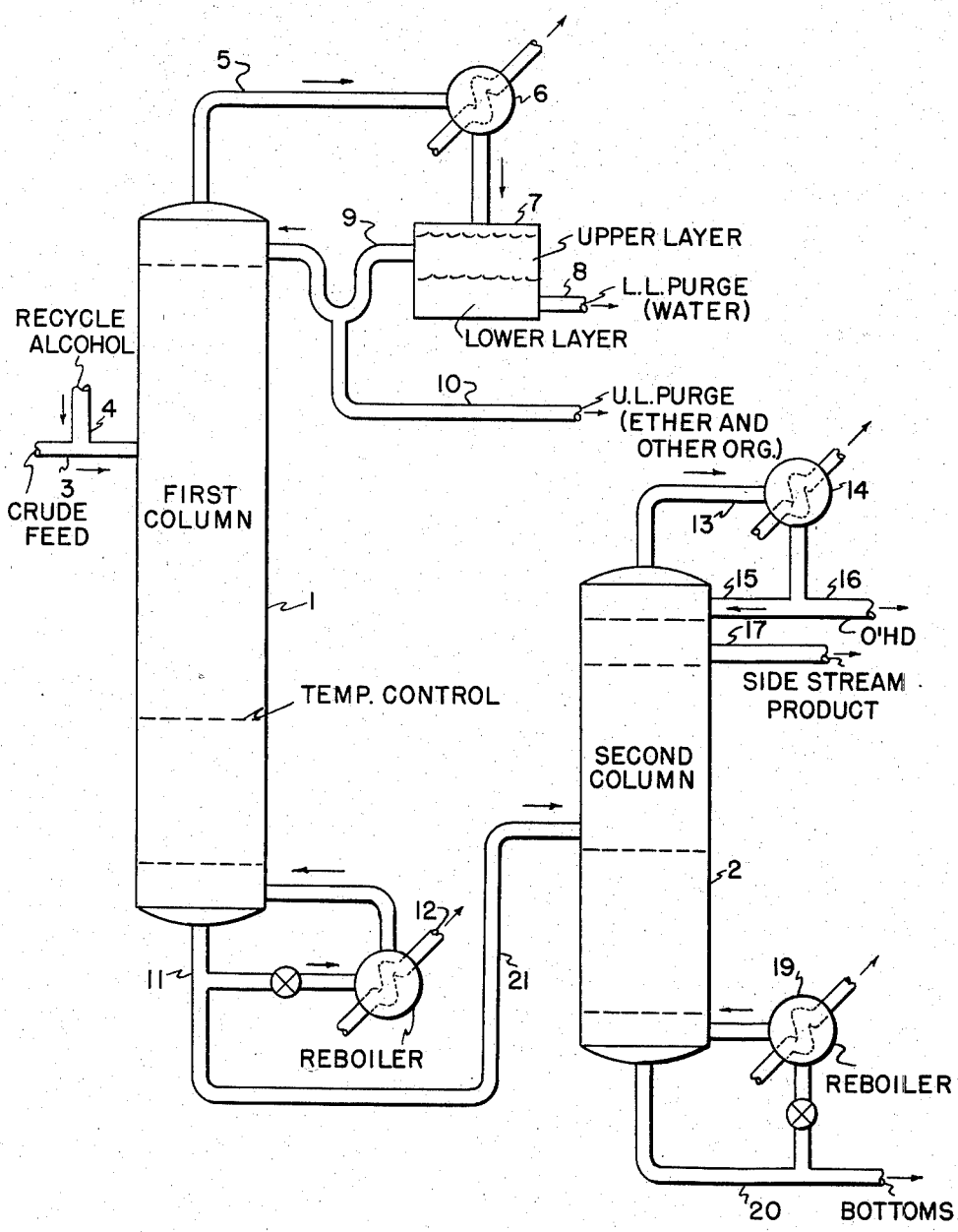

2,875,138
PURIFICATION OF SECONDARY BUTYL ALCOHOL

Royal K. Altreuter, Fair Haven, N. J., Joseph W. Dowling, Ras Tanura, Saudi Arabia, and John P. Racz, Lodi, and Philip W. Thomas, Scotch Plains, N. J., assignors to Esso Research and Engineering Company, a corporation of Delaware Application January 17, 1955, Serial No. 482,284

1 Claim. (Cl. 202—39)

This invention relates to a method for increasing efficiency of distillation in recovering high purity secondary butyl alcohol from the crude alcohol formed by hydration of a normal butylene mixture. The object is to improve the quality and yield.

The invention will be described with reference to the flow diagram in the drawing.

The distillation process is basically carried out in a two column unit. The crude alcohol is fed to a first column 1 in which essentially all of the compounds and azeotropes boiling below 99.5° C. and herein referred to as low boilers are removed with practially all the water of the feed as an overhead distillate. The butyl alcohol and remaining high boiling contaminants leaving the bottom of column 1 are removed as bottoms and fed to a second column 2.

In second column 2, the compounds boiling above 99.5° C. and referred to as high boilers are removed as bottoms. The high purity secondary butyl alcohol is removed preferably as a side stream near the top of column 2. A small overhead distillate stream is taken overhead from column 2 to purge trace amounts of low boilers which may distill in column 2 in the event of minor operating fluctuation or due to some decomposition of high polymers.

A typical crude alcohol feed to the unit comes from utilization of a sulfuric acid and normal butylene mixture. Typical compositions of the crude alcohol with a breakdown of low and high boilers are shown in the following table.

TABLE I
*Typical crude secondary butyl alcohol composition*

| Component | Wt. Percent | Range Wt. Percent |
|---|---|---|
| Sec. Butyl Alcohol | 70.1 | 70–75. |
| Low Boilers and Secondary Butyl Ether: | | |
|   Butylenes—1.9 | | |
|   Isopropyl Alcohol—1.8 | | |
|   Methyl Ethyl Ketone—0.03 | 6.4 | 5–10. |
|   Tert. Butyl Alcohol—0.17 | | |
|   Di-Sec. Butyl Ether—1.2 | | |
|   $C_5$-$C_8$ Hydrocarbons—1.3 | | |
| High Boilers: | | |
|   $C_5$+ Alcohols and Ketones | 0.8 | less than 1. |
|   $C_8$+ Hydrocarbons | | |
| Water | 22.7 | 25–15. |
| Total | 100.0 | |

In the earlier type of process, the crude alcohol was dehydrated or the butyl alcohol was concentrated; for example, using caustic soda to bring the water content down to about 6–9 weight percent. The concentrating permitted maximum throughput in a given column, but added a serious contaminant to the high boilers, the caustic soda. The caustic soda had to be purged with high boilers in the bottoms and in order to keep this stream fluid about 10% of the sec. butyl alcohol feed had to be purged with the bottoms. In general, earlier and existing processes have been found to give difficulty in producing high quality butyl alcohol on account of the contaminating effects of secondary butyl ether. The secondary butyl ether has the tendency of forming a number of azeotropes with components in the crude, such as shown in the following Table II.

TABLE II
*Azeotropes of secondary butyl ether*

| Azeotropes | Boiling Point, °C. |
|---|---|
| Sec. Butyl Ether–Isopropyl Alcohol–Water | 77.8 |
| Sec. Butyl Ether–Sec. Butyl Alcohol–Water | 84.3 |
| Sec. Butyl Ether–Water | 86.5 |
| Sec. Butyl Ether–Sec. Butyl Alcohol | 99.1 |
| Sec. Butyl Ether | 121.0 |

The distilled vapor compositions and boiling characteristics are further complicated by the other azeotropes which tend to be formed; as for example, the binary of isopropanol and water and azeotropes of the hydrocarbons. It is shown by these facts that with the variable water content in the feed, there is a chance that some of the low boiling impurities will not be satisfactorily removed overhead in a first column. Thus the secondary butyl ether which would remain forms an azeotrope with a boiling point so close to the boiling point of sec. butyl alcohol as to interfere with recovery of a pure sec. butyl alcohol fraction in the second column.

The satisfactory removal of all the low boilers including sec. butyl ether azeotropes depends on having a sufficient amount of water present in the feed to the first column and on carrying out the distillation in the first column under more intense conditions for distilling overhead a substantially greater amount of secondary butyl alcohol than would be ordinarily taken overhead under conventional practice. Data will be given to show that this is true, but first, a further explanation will be made of the process steps with reference to the drawing.

Using as column 1 a tower with from 40 to 50 plates, the crude sec. butyl alcohol feed is introduced by feed line 3 on to about the 30th plate. Recycle alcohol may be admixed from line 4.

Pressures and temperatures are adjusted in column 1 by temperature control on plate 10 set at 96° C. to take overhead vapors having normal boiling points in the range of 84° to 99.5° C. Thus with a superatmospheric pressure of the order of 1 to 3 p. s. i. g. the temperature of the overhead vapors will be about 84° C. and will vary according to the pressure.

The overhead vapors will lead through line 5 to condenser 6 and condensate is caught in the decanter 7 where the distillate separates into an upper organic layer phase (U. L.) and a lower water-rich phase (L. L.).

The aqueous lower layer is withdrawn through line 8 to be discarded or passed to a slop recovery tower. The organic upper layer is withdrawn through line 9 to provide purge and reflux to the upper part of column 1. A portion of the organic upper layer is withdrawn through line 10 to purge some of the contaminants. The reflux rate is adjusted to prevent water or ether from reaching column bottoms. Reflux is increased to remove more water and is decreased to remove more ether (within limits of steam to reboiler and column capacity).

With the requirement of the present process that there be a substantially increased amount of butyl alcohol distilled overhead, it is important to reflux an increased amount of the organic upper layer. This necessitates having a higher capacity in the first column on account of the greater water loading and increased reflux. This is the major reason for a larger first column. Butanol content of overhead depends a great deal on azeotropes. A suitable reflux ratio for the first column is of the order of 12 parts reflux to 1 part of organic layer purged. A superatmospheric pressure of the order of 2 p. s. i. g. in column 1 is desirable to keep the temperature in the lower part of the column in the range of 96° C. (at 10th plate) and 104° C. at bottoms to indicate dryness. This is accomplished by recycling a portion of the bottoms withdrawn through line 11 through the reboiler 12 and passing the reboiled bottoms back to the bottom of column 1. The remaining portion of the bottoms is passed on through line 21 to the product recovery column 2.

The product recovery column 2 does not need as many plates as column 1. It may have about 20 plates. The column 1 bottoms feed is introduced into column 2 at a midsection. In column 2 the pressure is lower than in column 1, e. g. of the order of atmospheric pressure to 1 p. s. i. g. Vapors are taken overhead from column 1 at about 99.5° C. through line 13 to condenser 14. A portion of the condensate is refluxed by line 15 and a remaining portion of the overhead product is withdrawn through line 16. When the unit is in proper operation the overhead product from column 2 will have a secondary butyl alcohol purity of the order of 98 to 99 wt. percent. Then, a 99+% purity side stream product of secondary butyl alcohol can be withdrawn from one of the upper plates, e. g. the 15th to 18th plate through line 17 where the temperature is of the order of 99.5 to 100° C. Bottoms of column 2 are withdrawn by line 18. A portion of the bottoms is recycled through reboiler 19 and the remainder of the bottoms from column 2 at a temperature in the region of 120° to 125° C. is withdrawn through line 20 as a purge stream.

The following example is given to illustrate stream analyses when the operation is carried out in accordance with the present invention to prevent secondary butyl ether from entering the product recovery column.

TABLE III

*Stream analyses, wt. percent*

| Component | Stream Line No. | | | | | | | |
|---|---|---|---|---|---|---|---|---|
| | Feed (3) | Btms. (21) | U. L. (10) | L. L. (8) | Recycle (4) | Prod. (17) | Btms. (20) | O'hd (16) |
| Sec. Butyl Alcohol | 73.97 | 98.94 | 54.04 | 10.44 | 92.65 | 99.90 | 50.0 | 98.5 |
| Isopropyl Alcohol | 1.17 | 0.10 | 2.39 | 2.66 | | 0.06 | | 0.15 |
| Sec. Butyl Ether | 2.08 | | 21.36 | | 4.44 | | | |
| Hydrocarbons | 0.20 | | 1.54 | | | | | |
| Methyl Ethyl Ketone | 0.14 | 0.23 | 1.94 | 0.62 | 1.25 | trace | | 1.11 |
| High Boilers | 0.56 | 0.70 | | | 1.66 | | 50.0 | |
| Gas (C₄) | 3.48 | | 12.05 | | | | | |
| Water | 18.40 | 0.03 | 6.68 | 86.28 | | 0.04 | | 0.22 |

Important points in analyses: (17) Product purity high. (20) Bottoms purge of alcohol small, needs no reclamation.

The foregoing analyses illustrate that complete removal of the secondary butyl ether overhead from column 1 can be accomplished by having sufficient water in the feed without having the water interfere in the product recovery column. This desired result is effective by having a substantial amount of the butyl alcohol distill overhead in the first column. Nevertheless, the overall recovery of higher purity secondary butyl alcohol is increased, this product being obtained as the upper side stream product of column 2. These advantages have been demonstrated as summarized in the following table which makes a comparison of the present process with the earlier conventional process. The earlier conventional process is the type wherein less water, e. g. about 5 to 10 weight percent is maintained in the feed by chemical dehydration and wherein there is less intense fractionation carried out in the first column.

Table IV

*Comparison of product, quality and yield*

| | Butyl Alcohol | Water | Butyl Ether | Propyl Alcohol | Product Yield [1] |
|---|---|---|---|---|---|
| Conventional Process | 99.2 | 0.2 | 0.3 | 0.3 | 88.0 |
| Process of Present Invention | 99.8 | 0.1 | 0.0 | 0.1 | 92.0 |

[1] Once through basis.

The invention described is claimed as follows:

A process for purifying a crude secondary butyl alcohol mixture containing impurities lower boiling than said secondary butyl alcohol including isopropyl alcohol, hydrocarbons, and methyl ethyl ketone, organic impurities higher boiling than said butyl alcohol including secondary butyl ether and having a water content of 15 to 25 wt. percent, which comprises introducing said mixture into a distillation zone wherein a superatmospheric pressure is employed and wherein a temperature of 96° to 104° C. is maintained at the bottom of said zone, distilling said crude secondary butyl alcohol in the absence of added entrainer to remove overhead vapors having normal boiling points in the range of 84° to 99.5° C. including secondary butyl alcohol vapors in excess of the amount passing off azeotropically, substantially all of the water and secondary butyl ether, recovering as bottoms crude anhydrous secondary butyl alcohol substantially free of secondary butyl ether and said lower boiling impurities, and finally fractionating said crude anhydrous secondary butyl alcohol to obtain a secondary butyl alcohol of 99+% purity.

References Cited in the file of this patent

UNITED STATES PATENTS

| | | |
|---|---|---|
| 2,386,058 | Patterson et al. | Oct. 2, 1945 |
| 2,392,534 | Von Keussler | Jan. 8, 1946 |
| 2,487,086 | Amick et al. | Nov. 8, 1949 |
| 2,548,460 | Amick | Apr. 10, 1951 |
| 2,591,877 | Robertson et al. | Apr. 8, 1952 |
| 2,640,017 | Graff | May 26, 1953 |
| 2,663,679 | Drout | Dec. 22, 1953 |
| 2,666,736 | Robertson et al. | Jan. 19, 1954 |